Dec. 26, 1967  B. J. STOCKER ET AL  3,360,677
LINEAR ACCELEROMETERS UTILIZING A
DISPLACEABLE ELECTRON BEAM

Filed Feb. 1, 1965  3 Sheets-Sheet 1

INVENTOR.
BRIAN J. STOCKER
GEORGE F. WESTON
BY
*Frank R. ...*
AGENT

United States Patent Office 3,360,677
Patented Dec. 26, 1967

3,360,677
LINEAR ACCELEROMETERS UTILIZING A DISPLACEABLE ELECTRON BEAM
Brian John Stocker, Thornton Heath, and George Frederick Weston, Merstham, England, assignors to North American Philips Company, Inc., New York, N.Y.
Filed Feb. 1, 1965, Ser. No. 429,332
Claims priority, application Great Britain, Jan. 31, 1964, 4,354/64
9 Claims. (Cl. 313—192)

ABSTRACT OF THE DISCLOSURE

A linear accelerometer includes a gas-filled arc discharge tube having an anode and cathode arranged to produce a generally rectilinear discharge path therebetween that extends perpendicular to the direction of the acceleration forces to be measured. First and second opposed wire-shaped probe electrodes are symmetrically mounted on either side of the path along an axis bisecting the path at right angles. The acceleration forces cause the discharge path to bend towards one of the probes thereby producing a potential difference across the probes that is proportional to the acceleration forces.

---

Figure 1:
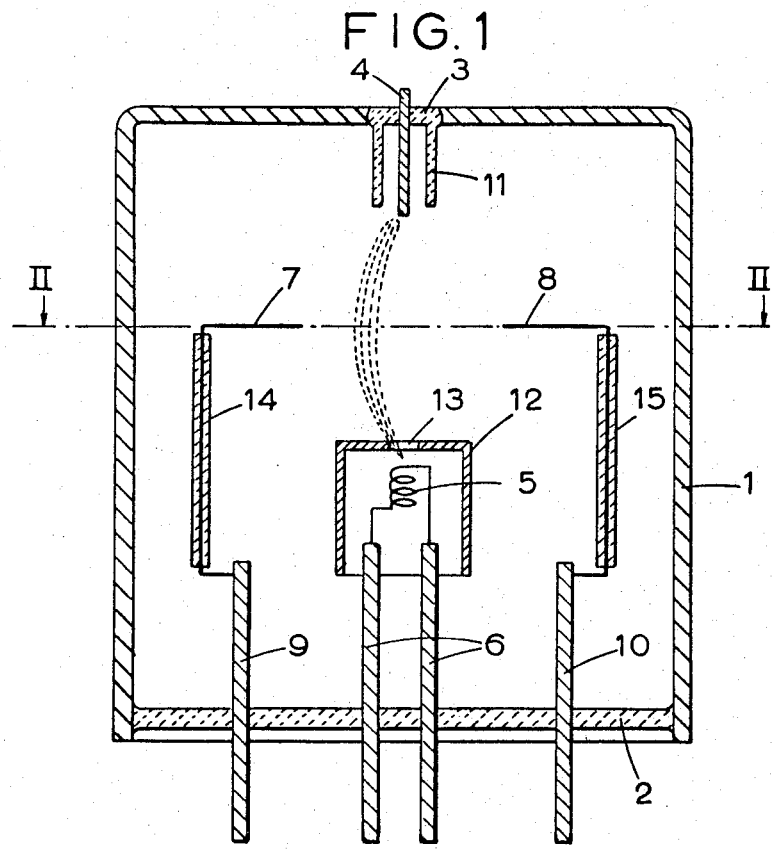

The present invention relates to a linear accelerometer for measuring the acceleration of a moving body.

In an arc or glow discharge having a constricted positive column, there is some curvature of the positive column which curvature is produced by convection of hot gas which has been heated by the discharge. Convection in a gas depends upon the acceleration acting on the gas, and thus the curvature of the arc is dependent upon the acceleration. This curvature can be detected by probe electrodes. As the arc curves towards a probe the density of the ions and electrons in the neighbourhood of the probe increases so that the probe, if it is unconnected to an external circuit, acquires a more negative static potential with respect to the anode. If the probe is connected in an external circuit through current or voltage-measuring devices, then an output voltage or current can be observed which varies as the acceleration varies.

An object of the present invention is to provide a gaseous accelerometer which will measure the acceleration of moving objects.

According to the present invention a linear accelerometer comprises an envelope having a gas filling, a cathode and an anode so located within the envelope as to provide between them a substantially rectilinear cathode-anode discharge path, and a pair of probe electrodes located one on each side of said discharge path on an axis bisecting the discharge path at right angles to the said path. When the discharge-tube is subjected to an acceleration in a direction along the said axis, the discharge path alters its shape and thereby differentially alters the potentials appearing at the probes. The accelerometer may be provided with a further pair of probes arranged to give a measure of acceleration in a direction at an angle to the line joining the first-mentioned pair of probes. Preferably, the gas filling is an inert gas and suitably may be of xenon at a pressure above 30 torr or at higher pressures with other inert gases or mixtures of gases, for example, 300 torr of 90% neon, 10% xenon. With a rare gas a constricted positive column can be obtained at a relatively low current (100 ma. or less).

The cathode, which should preferably be able to withstand ion bombardment, may be either a cold cathode of the type used in some fluorescent lamps or a heated tungsten spiral filament or oxide-coated cathode. A cathode which has been found particularly suitable when used in an arc-discharge arrangement is a dispenser cathode, also known as an L-cathode. The anode may be a pointed rod suitably 5 mm. from the cathode. Suitably the probes may be connected to the anode via resistors, the difference in the probe currents or potentials being measured to give an indication of the acceleration. If a tungsten filament or heated oxide coated cathode is used as cathode it is preferable that it be contained in a metal can having a small hole through which the discharge may pass. This effectively anchors the discharge and prevents the discharge from extending from an ill-defined region on the cathode.

Preferably the wire probes, except at their ends, are shielded from the discharge by sleeves of insulating material, for example, glass. This is to prevent the discharge from affecting the probe except at its end. In the interests of ruggedness the envelope may be of metal.

Figure 2:
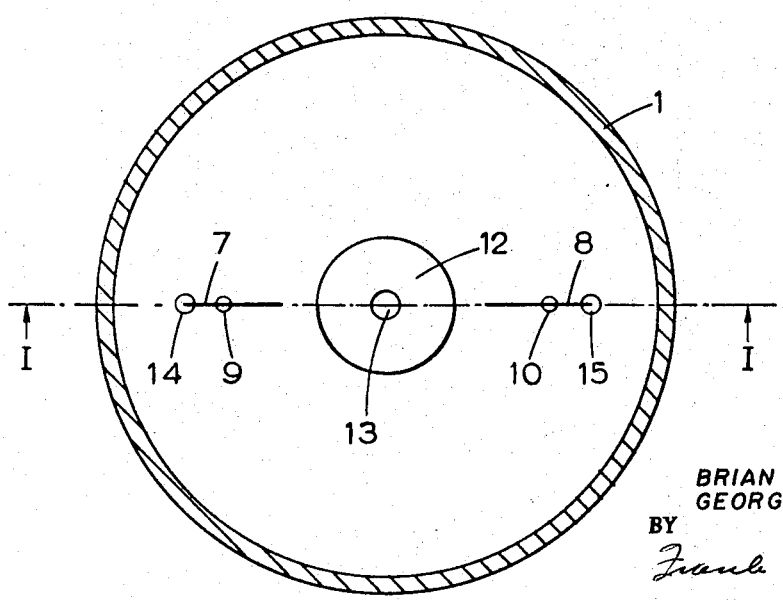
Figure 3:
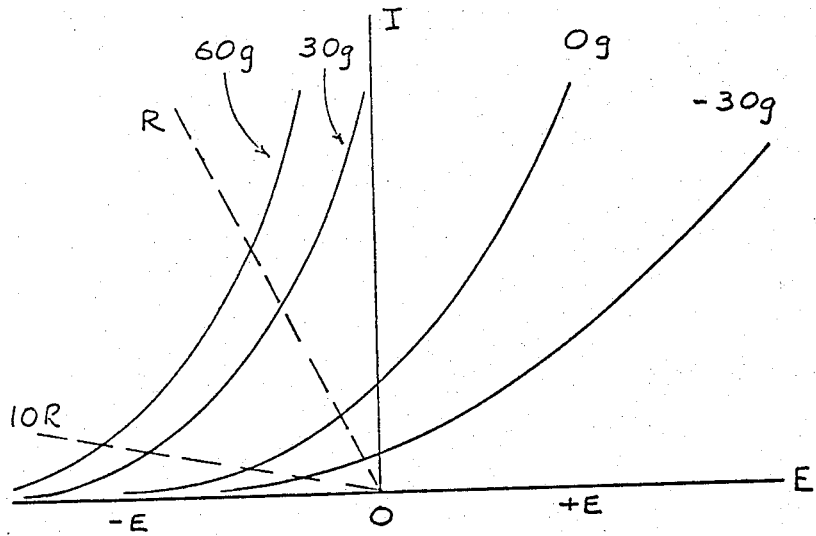
Figure 4:
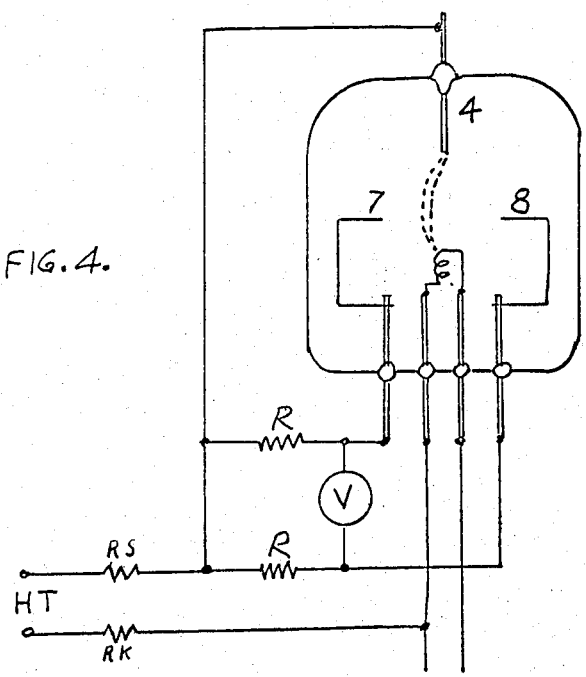
Figure 5:
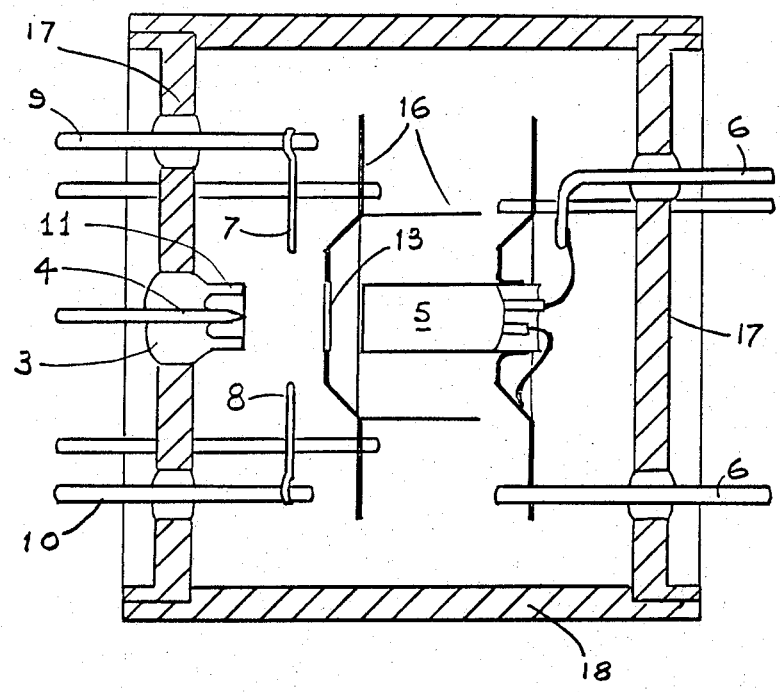

In order that the invention may be readily carried into effect embodiments thereof will now be described, by way of example, with reference to the accompanying diagrammatic drawings in which:

FIGURE 1 is a sectional view of a first embodiment,
FIGURE 2 is a cross-sectional view along the line II—II of FIGURE 1,
FIGURE 3 illustrates current/voltage characteristics of the device,
FIGURE 4 illustrates some of the circuit details of the device, and
FIGURE 5 illustrates a second embodiment.

Referring now to FIGURES 1 and 2, a linear accelerometer comprises a metal envelope 1 having a glass base 2 and a glass bead 3 in its wall. An anode 4 in the form of a rod protrudes through the bead 3 into the interior of the accelerometer. The accelerometer further comprises a tungsten filament cathode 5 to which power may be supplied through pins 6. Two wire probes 7 and 8 are located within the envelope on a line which bisects the line joining the cathode 5 and the anode 4 at right angles. The probes 7 and 8 are substantially equidistant from the line joining the anode and the cathode. The probes 7 and 8 are joined to metal pins 9 and 10, respectively, which pass through the glass base 2.

The anode 4 is shielded over most of its length by means of a glass cylinder 11 which forms an integral part with the bead 3. The cathode 5 is shielded by means of a metal can 12 having a small aperture 13 through which the discharge may pass. The cylinder 11 and the can 12 tend to anchor the ends of the discharge occurring between the anode and the cathode, thereby decreasing variations in the shape of the discharge. The probes 7 and 8 are provided with glass sheaths 14 and 15, respectively, which ensure that only the ends of the probes are affected by the discharge.

The gas filling may be of any rare gas but it has been found that a mixture of 90% neon and 10% xenon at a pressure of 300 torr is suitable. The spacing between the opposed ends of the probes 7 and 8 may be of the order of 15 millimetres. By changing the gas composition and pressure and the probe and anode-cathode spacing, the range of acceleration measured can be controlled. In a device as described above, a change in output may be obtained between 0 and 50 g.

Referring to FIGURE 3, there is illustrated the general form of the current/voltage characteristics of the probes in one embodiment of a gaseous linear accelerometer. The accelerometer was mounted in a suitable test rig and an anode-cathode arc discharge of some 50 milliamps was set up by the application of a supply source to electrodes 4 and 5. The currents flowing to the probes were then measured for various applied probe voltages so as to obtain a current/voltage characteristic and the experiment was repeated for various applied accelerations. In FIGURE 3 curves are shown for accelerations of 60 g., 30 g., zero and −30 g. The characteristic for −30 g. implies of course, an acceleration applied in the opposite direction from that yielding the curves for positive acceleration.

If a resistive load R is connected in series with each probe then we can determine from the static characteristics a dynamic characteristic by taking various intercepts along the load line. In FIGURE 3 are drawn, for illustration, two load lines for resistive loads R and 10R, respectively. A signal may be extracted from the probes by measuring the variation in probe current as the applied acceleration varies, but it is more convenient to extract a signal which is in the form of a voltage appearing across the load resistor R and the general circuit of such an arrangement is illustrated in FIGURE 4. Here, the voltmeter V measures the voltage difference between the two probes 7 and 8. The magnitude and sense of this voltage difference will be determined by the magnitude and sense of the acceleration applied to the discharge tube. It is preferable for the supply source HT to have a fairly high resistance, of the order of 5000 ohms, for example, so as to approximate a constant-current source. This source resistance may, if convenient, be provided by a resistor RS in the positive supply lead or by a resistor RK in the cathode supply lead, or by a combination of such resistors. A suitable value for the two probe resistors R is 10,000 ohms.

It was found that the ambient temperature had a considerable effect on the measurement of acceleration when the accelerometer was mounted on a centrifuge and so preferably the envelope of the accelerometer should be maintained at a constant temperature. A second pair of probes may be mounted in a line at right angles to the line joining the probes 7 and 8 and then if the acceleration is not along a line parallel to the lines joining the pairs of probes it is possible to measure the two components of this acceleration at right angles to one another. The resultant acceleration may then be computed.

FIGURE 5 illustrates a second embodiment wherein the envelope of the device is formed by a cylindrical casing 18 and two end pieces 17 all made of an iron-nickel-cobalt alloy. Between the anode 4 and the cathode 5 is a shield 16 supported on pins which extend through glass seals in an end piece and having a central aperture 13 through which the arc discharge passes in operation. In a similar manner to the construction illustrated in FIGURE 2, the heater is connected to pins 6 and other portions which serve the same purpose as portions of the device illustrated in FIGURE 2 are indicated by corresponding reference numerals. It will be observed that in the embodiment illustrated in FIGURE 5, glass sheaths are not provided on the supports which carry the probe wires 7 and 8.

In this embodiment the cathode-anode spacing was some 6 mm. A suitable filling was a mixture of 90% neon and 10% xenon at a pressure of between 200 and 400 torr, a pressure of 300 torr being suitable. The cathode was of the dispenser type. A suitable operating current, with such a mixed filling of 300 torr, was found to be 50 milliamps. The probe resistors R—see FIGURE 4—having resistances of 10K ohms each and the anode-cathode current being supplied through a 5K ohm resistor RS—see FIGURE 4. Alternatively, if pure xenon is used, the pressure can be reduced to 30 torr and in general it has been found advantageous to maintain a partial pressure of xenon of between 20 torr and 40 torr, for a device for measuring accelerations of up to 50 g.

What we claim is:

1. A linear accelerometer responsive to applied acceleration forces along a given axis comprising, a sealed container filled with gas, a rod-shaped anode mounted in said container substantially perpendicular to said given axis, a cathode in said container spaced apart from said anode and arranged to restrict the discharge path between said anode and cathode to a generally rectilinear path extending perpendicular to said given axis, first and second wire-shaped probe electrodes symmetrically mounted in said container on either side of said discharge path in opposed relationship along an axis bisecting said discharge path at right angles thereto, means for applying a voltage to said anode and cathode to establish an electric discharge along said path, and means coupled to said probe electrodes for indicating a potential difference produced across said electrodes and which is determined by the applied acceleration forces.

2. An accelerometer as defined in claim 1 wherein said indicating means comprises first and second resistors connected between said anode and said first and second probes, respectively, and a voltmeter connected across said probes.

3. An accelerometer as defined in claim 1 further comprising an open-ended glass cylinder coaxially mounted about said anode.

4. An accelerometer as defined in claim 3 wherein each of said probes comprises an L-shaped wire having a first portion extending perpendicular to the discharge path and a second portion extending parallel thereto, said accelerometer further comprising first and second insulating sheaths surrounding said second portion of said first and second probes, respectively.

5. An accelerometer as defined in claim 1 wherein said cathode consists of a dispenser cathode.

6. An accelerometer as defined in claim 1 wherein said container gas comprises xenon at a partial pressure of between 20 and 40 torr.

7. An accelerometer as defined in claim 1 wherein said container gas comprises a mixture of 90% neon gas and 10% xenon gas at a pressure of between 200 and 400 torr.

8. A linear accelerometer responsive to applied acceleration forces along a given axis comprising, a gas-filled arc-discharge tube, a rod-shaped anode mounted in said tube with its longitudinal axis perpendicular to said given axis, a cathode in said container spaced apart from said anode and arranged to restrict the discharge path between said anode and cathode to a generally rectilinear path extending perpendicular to said given axis, first and second opposed pairs of wire-shaped probe electrodes symmetrically positioned in quadrature around said discharge path and along first and second axes that bisect said discharge path at right angles thereto, means for applying a voltage to said anode and cathode to establish an electric discharge along said path, said acceleration forces causing said arc discharge path to alter its shape to produce a potential difference across said probes proportional thereto, and means coupled to said probes for measuring said potential difference.

9. An accelerometer as defined in claim 8 further comprising a metal can surrounding said cathode and having a small hole therein facing said anode, said anode having a pointed end facing said cathode.

References Cited

UNITED STATES PATENTS

| | | | |
|---|---|---|---|
| 3,106,678 | 10/1963 | Lynn | 73—517 |
| 3,110,185 | 11/1963 | Hughes | 73—517 |
| 3,138,732 | 6/1964 | Baker | 313—226 |
| 3,243,637 | 3/1966 | Atfleck | 313—346 |
| 3,263,113 | 7/1966 | Schroder | 313—227 |

FOREIGN PATENTS 644,959  7/1962  Canada.

S. D. SCHLOSSER, *Primary Examiner.*